Figure 1:
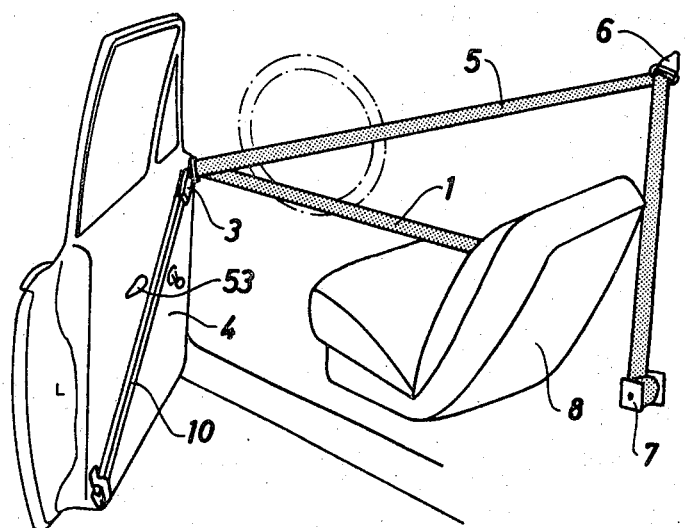

United States Patent [19]
Lindblad

[11] 3,822,760
[45] July 9, 1974

[54] SAFETY BELT ARRANGEMENT FOR INDIVIDUALS

[76] Inventor: Oskar Lennart Lindblad, Hedasgatan 16, 77020 Vargarda, Sweden

[22] Filed: Sept. 9, 1971

[21] Appl. No.: 179,134

[30] Foreign Application Priority Data

| Sept. 9, 1970 | Sweden | 12225/70 |
| Sept. 25, 1970 | Sweden | 13045/70 |
| Nov. 2, 1970 | Sweden | 14714/70 |
| Dec. 30, 1970 | Sweden | 17726/70 |
| Dec. 31, 1970 | Sweden | 17858/70 |
| Feb. 10, 1971 | Sweden | 1094/71 |

[52] U.S. Cl. ........................ 180/82 C, 280/150 SB
[51] Int. Cl. ............................................ B60r 21/10
[58] Field of Search .............. 280/150 SB; 180/82 C

[56] References Cited
UNITED STATES PATENTS

| 3,583,726 | 6/1971 | Lindblad | 280/150 SB |
| 3,679,229 | 7/1972 | Weststrate | 280/150 SB |
| 3,680,883 | 8/1972 | Keppel | 280/150 SB |

*Primary Examiner*—Robert R. Song

[57] ABSTRACT

Safety belt arrangement for vehicles which includes belts positions for extending across the body of a person sitting on a seat in the vehicle with one end of the strap secured to the vehicle on a side of the seat opposite a side wall of the vehicle and the other end of the strap slideably connected on the inside of a door of the vehicle and means for automatically displacing the belt along said door upon operation of the ignition circuit from in front of the seat to across the person.

20 Claims, 41 Drawing Figures

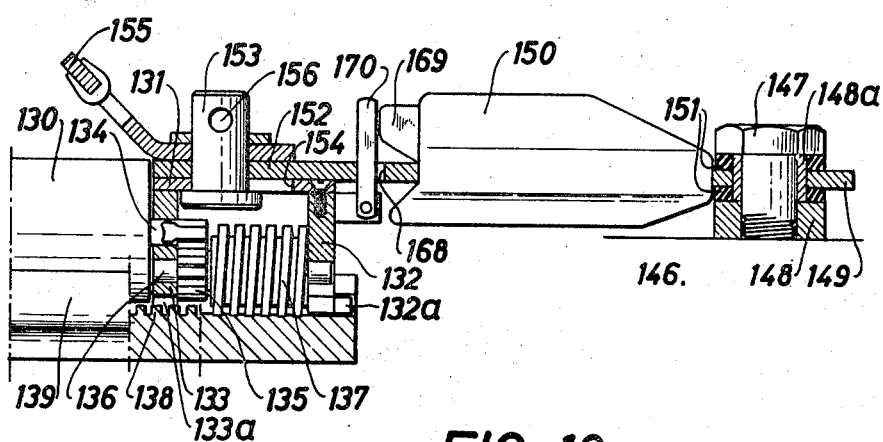
FIG. 19
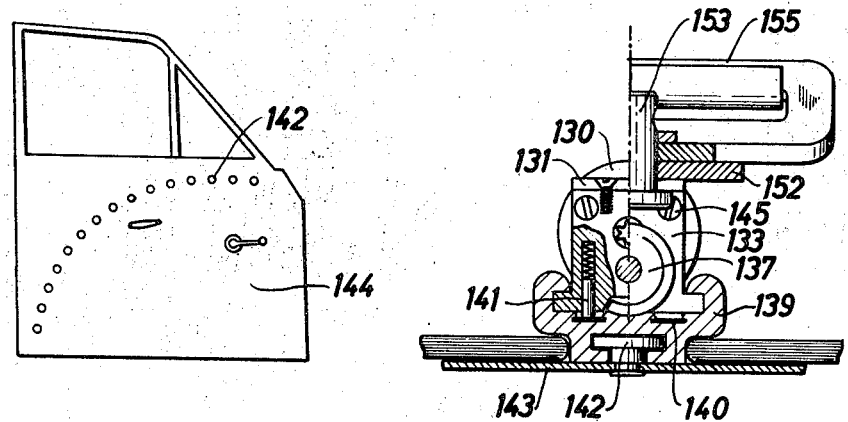
FIG. 21
FIG. 20

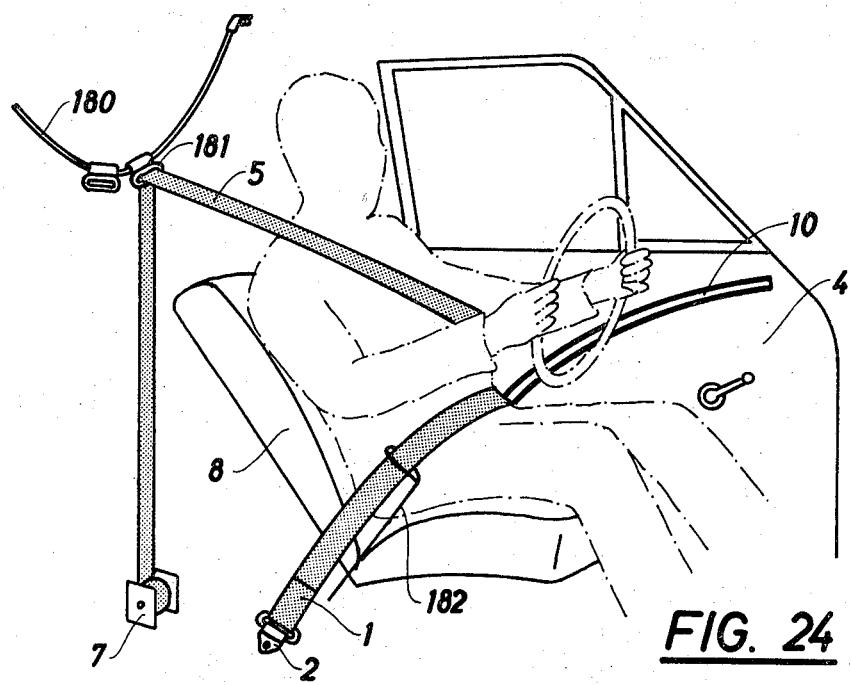
FIG. 24
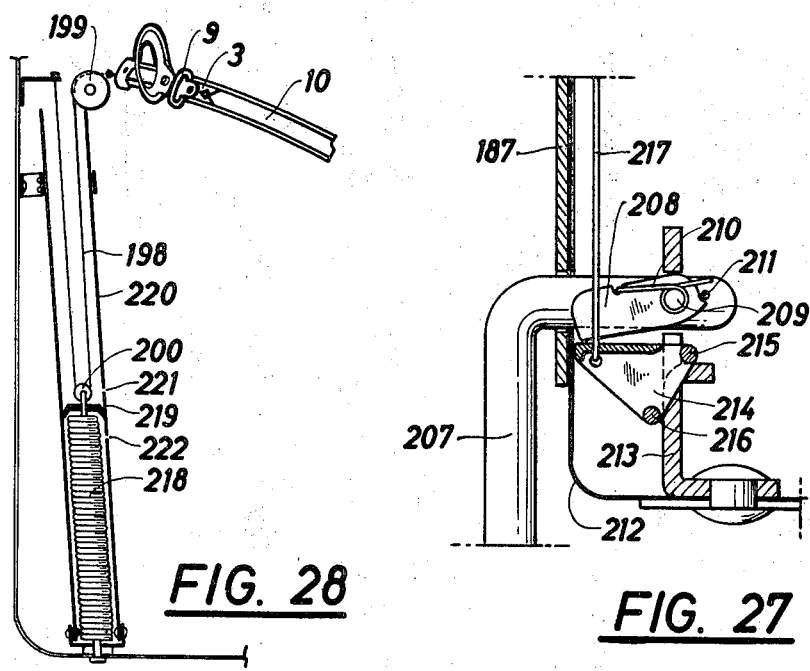
FIG. 28
FIG. 27

SAFETY BELT ARRANGEMENT FOR INDIVIDUALS

The present invention relates to safety belts for vehicles.

One object of the invention is to provide a safety belt which is very simple to put on so that persons using the vehicle will be induced to use the belt during each journey.

Another object of the invention is to provide a safety belt arrangement wherein the belt strap or straps in the position of non use are disposed in such a manner in front of the driver or passenger seat that it will not hinder entrance to the seat but will have to be tightened around the body in order not to cause any obstruction during the journey.

A further object of the invention is to provide a safety belt arrangement in which the strap or straps will automatically close around the driver or passenger after closing the door to the driver or passenger seat respectively, and upon closing an electric circuit. Still further objects of the invention will be apparent from the following detailed disclosure.

A safety belt arrangement according to the invention comprises at least one belt strap extending across the body of a person sitting on the seat provided with the safety belt arrangement, one end of said strap being secured to the seat or the chassis of the vehicle to that side of the seat which is opposite to the nearest side wall of the vehicle and the opposite end of said strap being connected to attachment means slidable in a guide from a front position in which the safety belt is inactive to a rear position in which the safety belt is tightened around a person sitting in the seat and vice versa.

According to other features of the invention said guide for the slidable attachment means may be provided on the inside of a door of the vehicle, means being provided for automatically displacing said attachment means towards its rear position upon turning of the ignition key.

Figure 2:
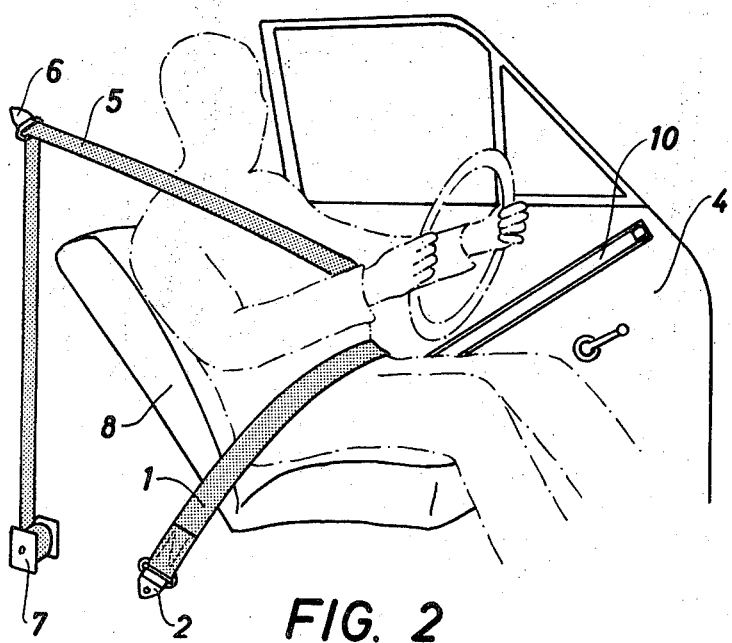
Figure 3:
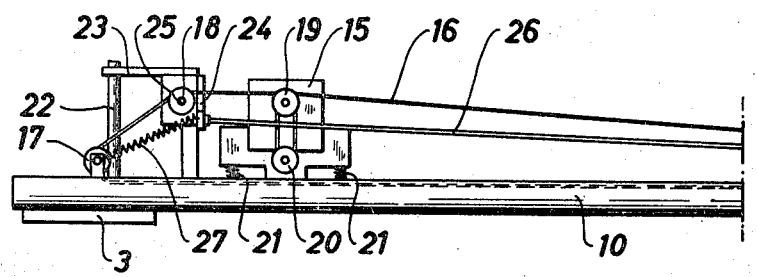
Figure 4:
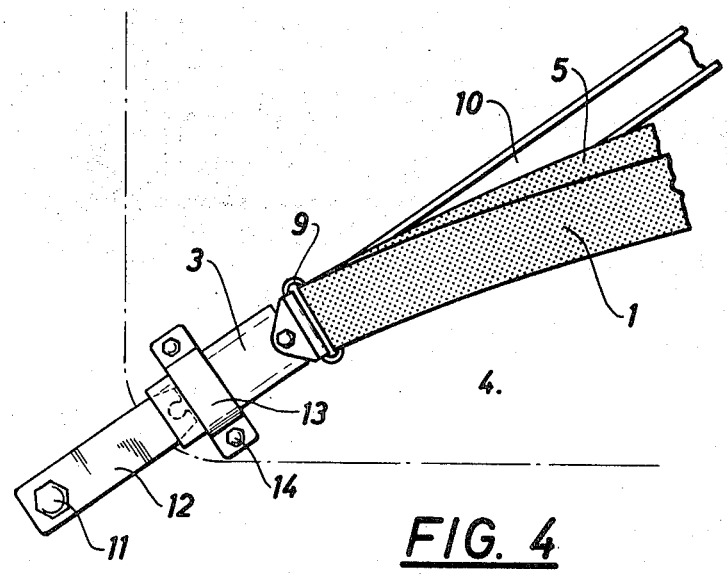
Figure 5:
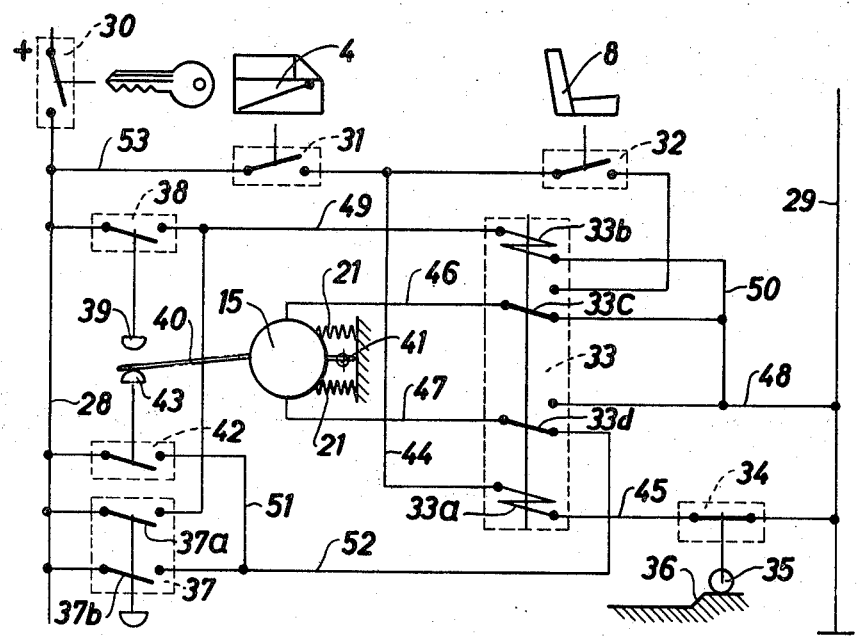
Figure 11:
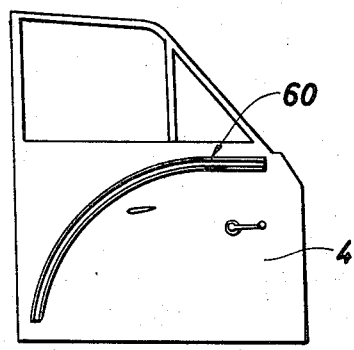
Figure 14:
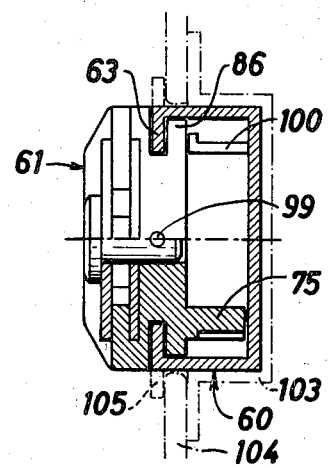
Figure 22:
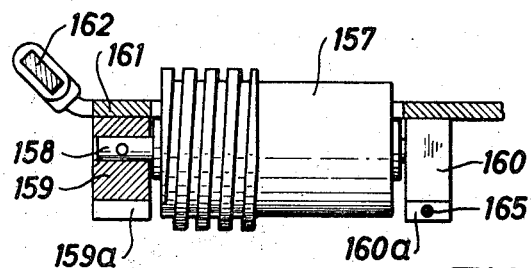
Figure 23:
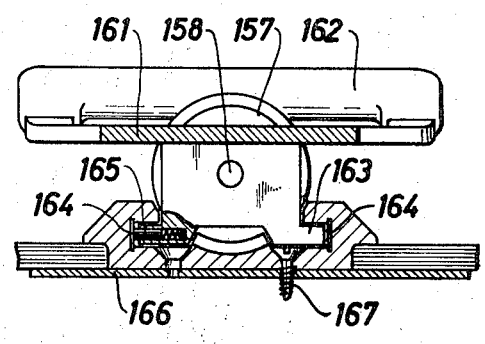
Figure 12:
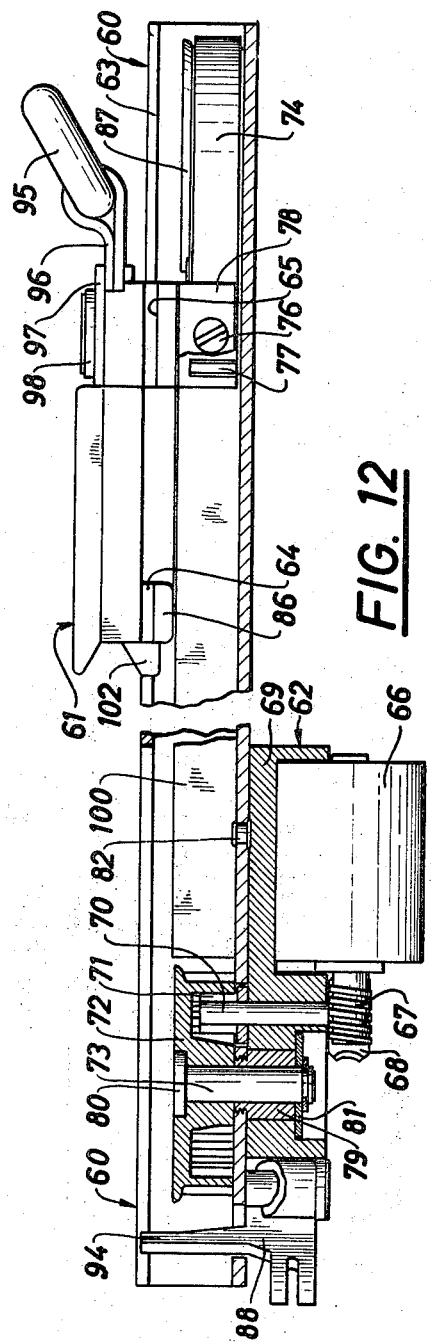
Figure 13:
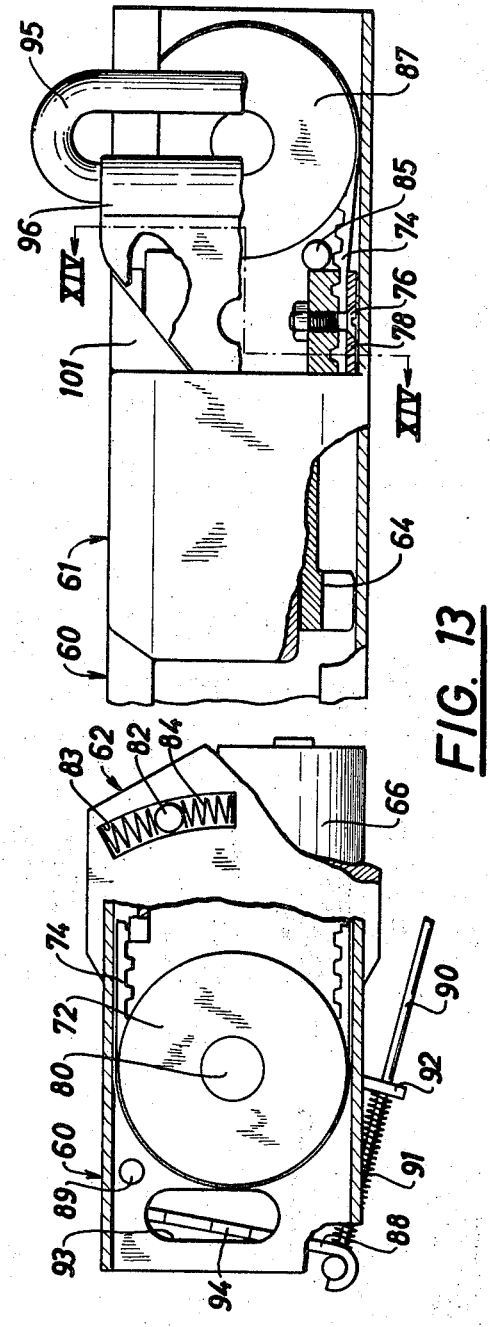
Figure 15:
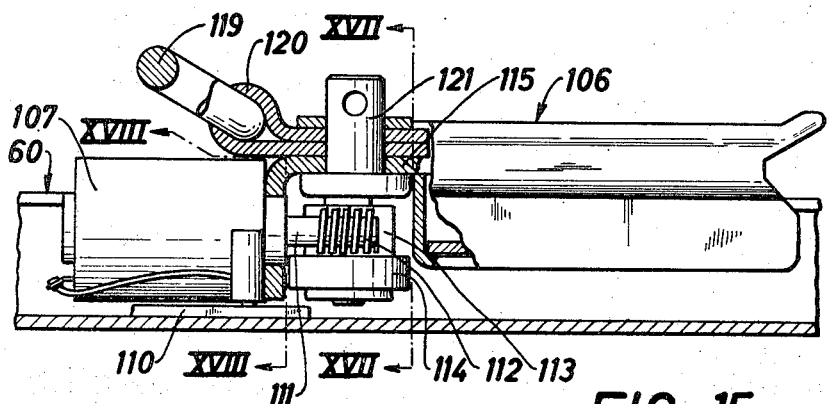
Figure 16:
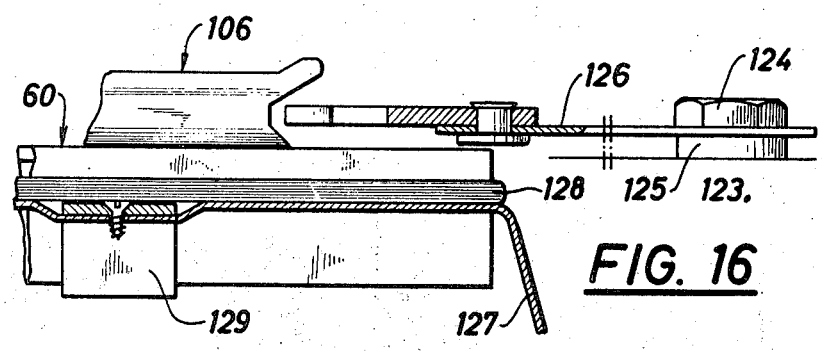
Figures 17, 18:
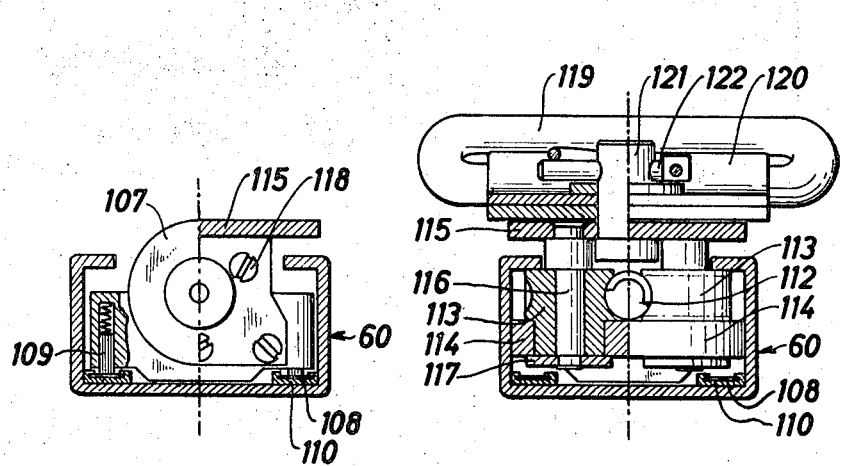
Figure 25:
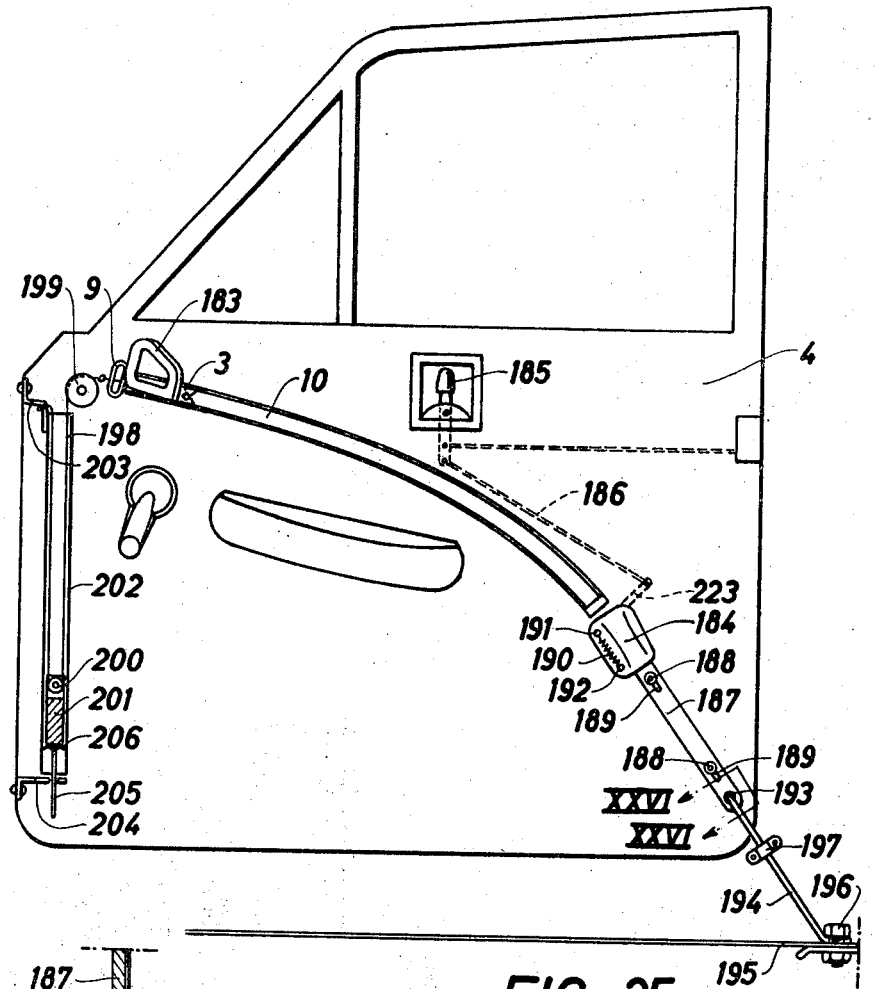
Figure 26:
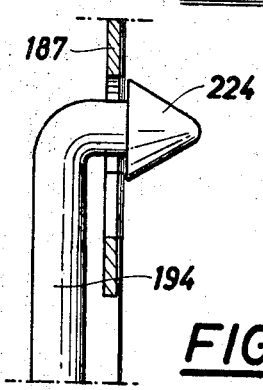
Figure 29:
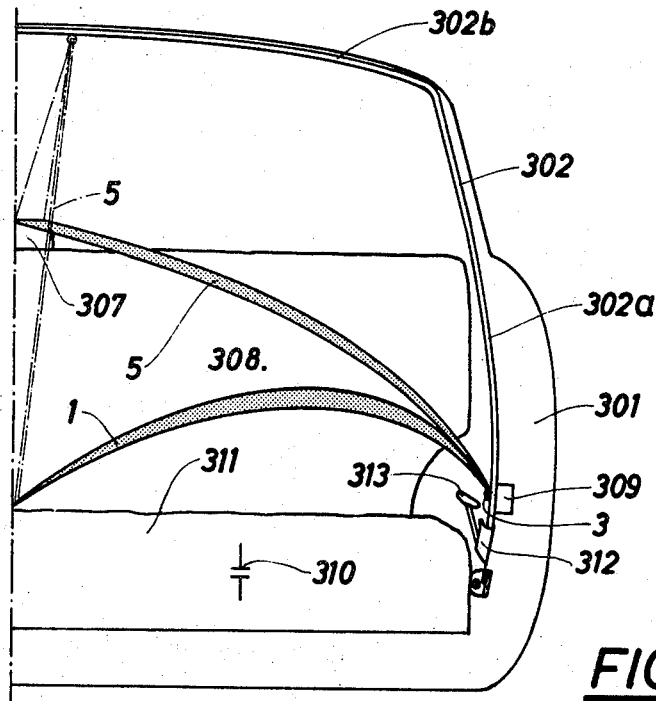
Figure 30:
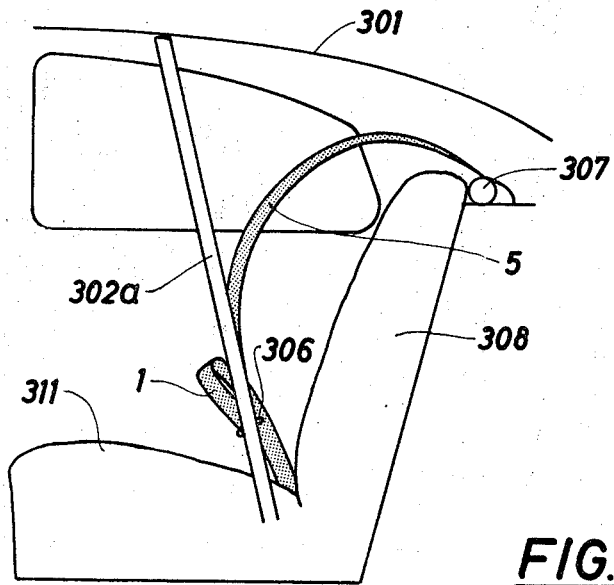
Figure 31:
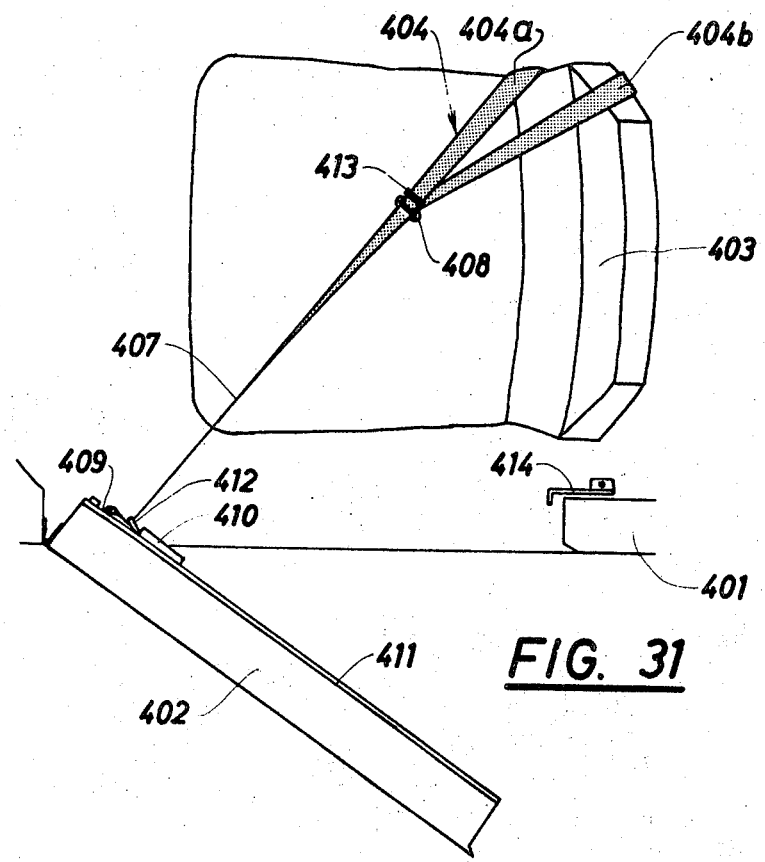
Figure 32:
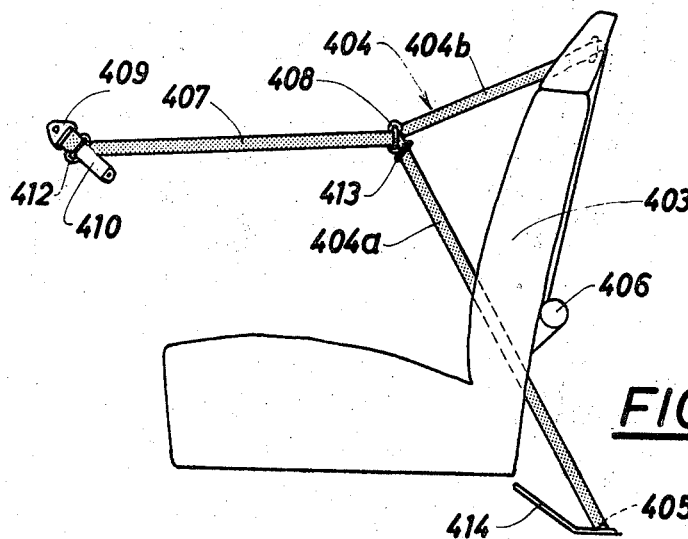
Figure 33:
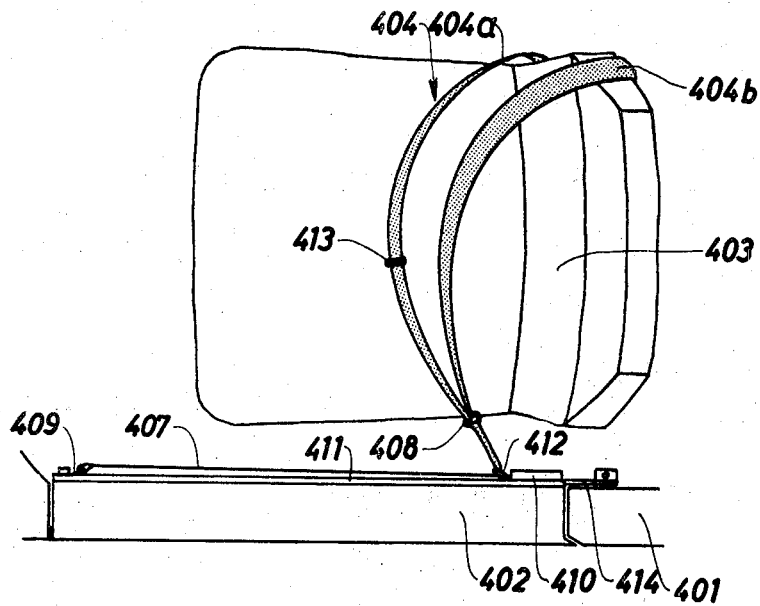
Figure 34:
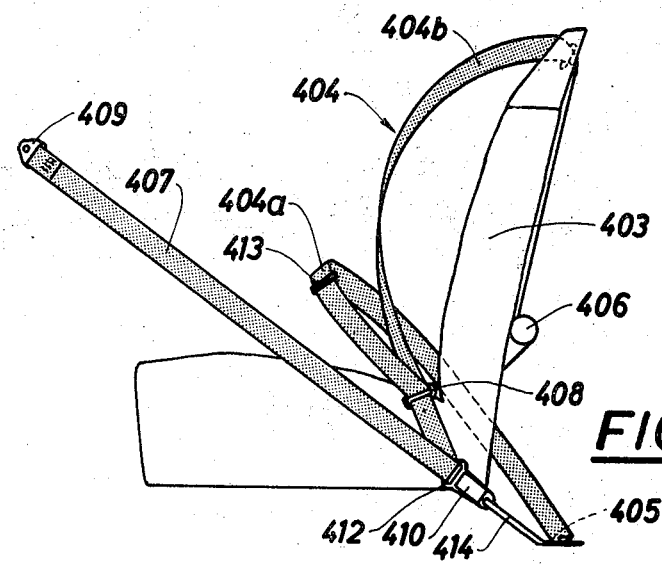
Figure 36:
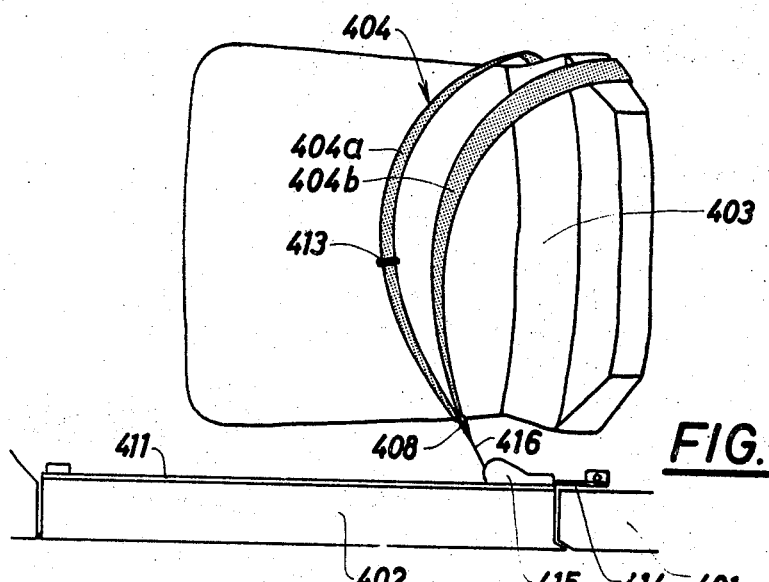
Figure 35:
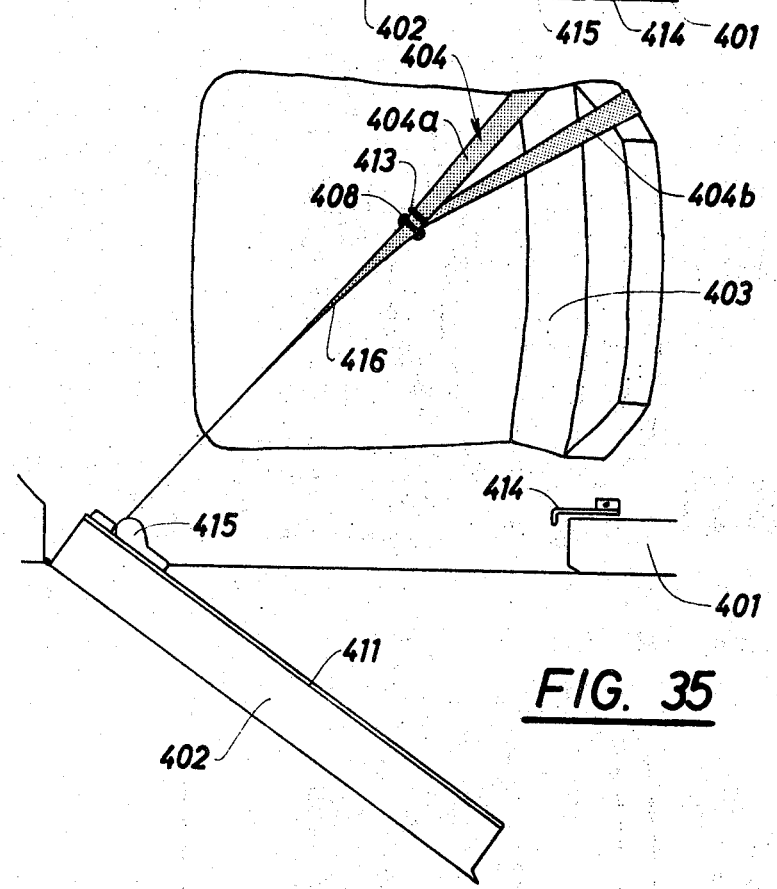
Figure 37:
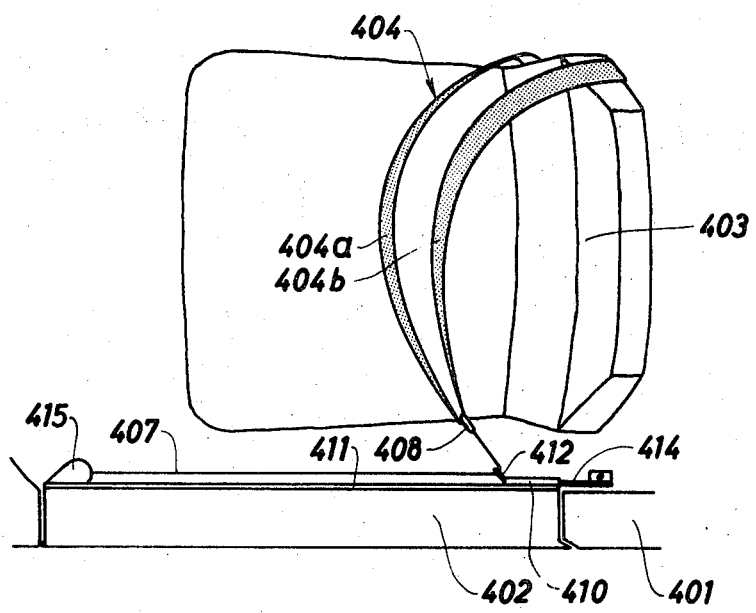
Figure 38:
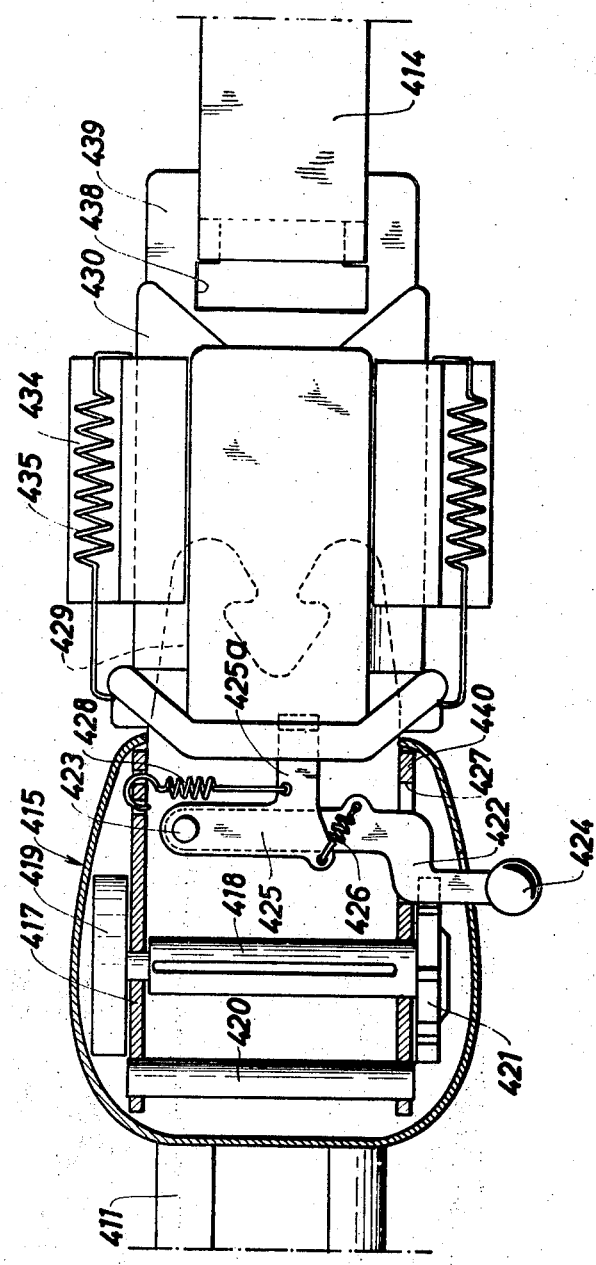
Figure 39:
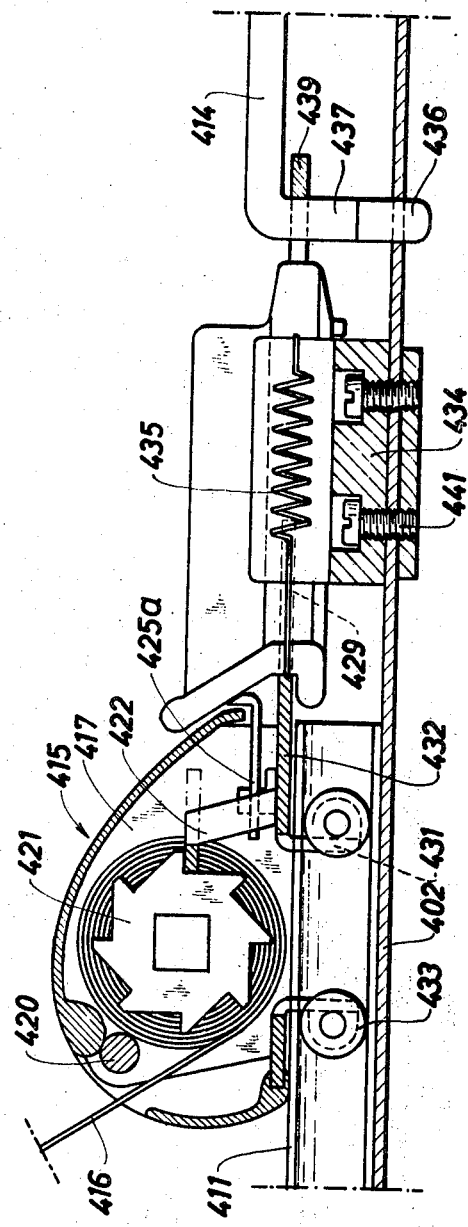
Figure 40:
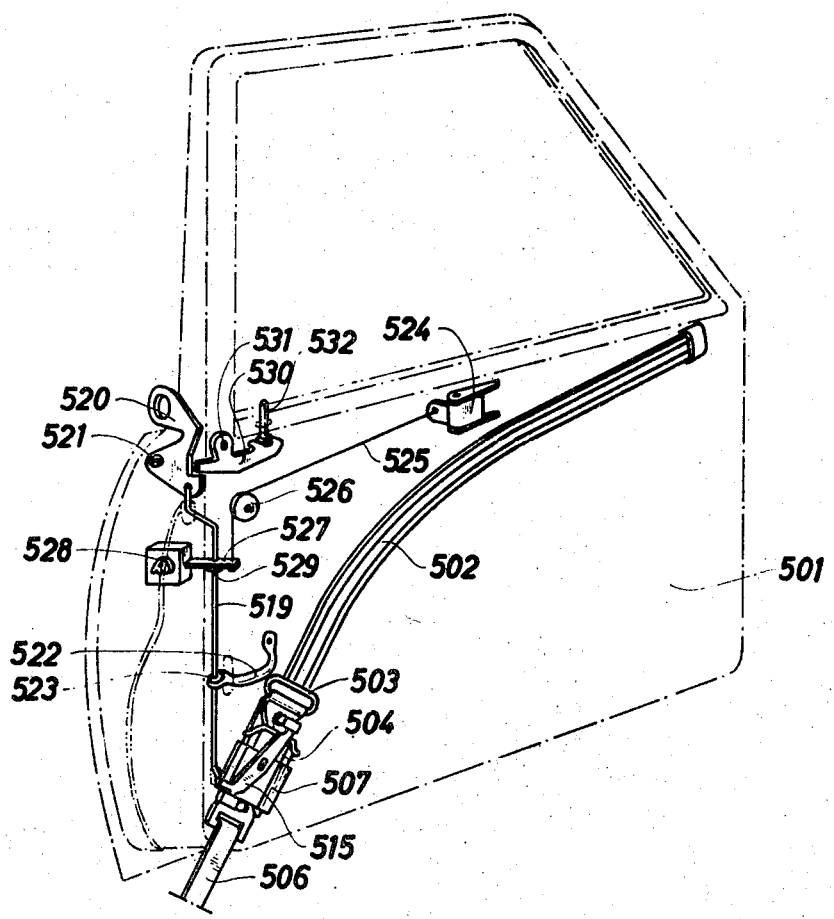
Figure 41:
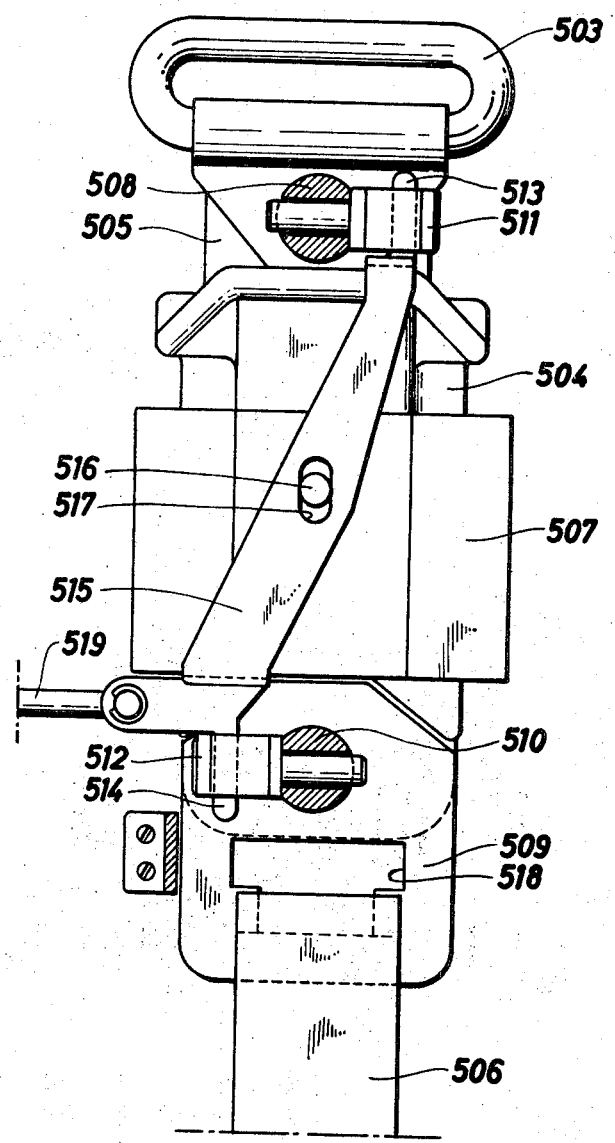

The invention will be more closely described herebelow with reference to the accompanying drawings wherein:

FIG. 1 is a view of an automobile driver's seat with the door to the driver's seat open and showing a safety belt arrangement according to the invention in position of none use, FIG. 2 is a view of the same arrangement seen from inside the automobile and with the safety belt in use, FIG. 3 shows a detail of the safety belt arrangement drawn to a larger scale, FIG. 4 illustrates another detail of the arrangement also to a larger scale than in FIGS. 1 and 2, FIG. 5 is a diagram of an electric circuit contained in the arrangement and shown in the state in which the safety belt is in its position of non use, FIGS. 6 – 10 inclusive show the same circuit in various stages of "putting on" and "putting off" the safety belt, FIG. 11 shows the inside of an automobile door provided with a displaceable attachment guide of a different configuration from that shown in FIG. 1, FIG. 12 is a longitudinal cross section through a slidable attachment means, the guide therefore and means for driving the attachment means, FIG. 13 is a partly broken view of the arrangement seen from the upper side according to FIG. 12, FIG. 14 is a cross section substantially along the line XIV—XIV in FIG. 13, FIG. 15 is a partly broken side view of an attachment means according to a second embodiment, FIG. 16 is a similar view with the slidable attachment member situated near the lower end of the guide, FIG. 17 is a cross section substantially of the line XVII—XVII in FIG. 15, FIG. 18 is a cross section taken substantially on the line XVIII—XVIII IN FIG. 15, FIG. 19 is a partly broken side view of the arrangement, FIG. 20 is a cross section through the arrangement according to FIG. 19, FIG. 21 illustrates an automobile door provided at its inner side with means for mounting the guide for the slidable attachment means, FIG. 22 is a partly broken side view of an attachment means according to a further embodiment, FIG. 23 is a cross section to the attachment means according to FIG. 22, FIG. 24 illustrates a further embodiment of the invention in a view similar to that in FIG. 2, FIG. 25 is a view from the inner side of an automobile door provided with an arrangement according to the invention, FIG. 26 is a section along the line XXVI—XXVI in FIG. 25, FIG. 27 is a similar section illustrating another embodiment of the detail shown in FIG. 26, FIG. 28 illustrates a modified embodiment of another detail comprised in the arrangement, FIGS. 29 and 30 show a safety belt arrangement according to the invention mounted in the back seat of an automobile, FIG. 31 is a view from above of a driver's seat in a vehicle provided with a safety belt arrangement according to the invention, the door of the vehicle being open and the safety belt being in its inoperate position, FIG. 32 is a side view of the arrangement shown in FIG. 31 with the side wall and the door of the vehicle removed for clarity, FIG. 33 is a view corresponding to FIG. 31 with the door closed and the belt in its active position, FIG. 34 is a side view corresponding to FIG. 32 with the safety belt in the same position as in FIG. 33, FIG. 35 is a view corresponding to FIG. 31 showing a safety belt of a different embodiment in its inoperate position, FIG. 36 is a view corresponding to FIG. 33 illustrating the safety belt shown in FIG. 35 in its active position, FIG. 37 is a view corresponding to FIGS. 33 and 36 showing a safety belt of a further embodiment, FIG. 38 is a view partly in section of a detail comprised in the safety belt illustrated in FIGS. 35 and 36, FIG. 39 is a side view of a detail according to FIG. 38 with some portions in section, FIG. 40 is a view in perspective of an automobile door provided with an arrangement according to still another embodiment of the invention, and FIG. 41 is a view to a larger scale of a detail of the arrangement illustrated in FIG. 40.

In the embodiment illustrated in FIGS. 1 – 10 in the drawings the safety belt is of the so called 3-point type, i.e. a lap and shoulder belt with a common attachment point for one end of the lap and shoulder straps. The lap belt 1 has one end attached to an attachment 2 which is secured preferably to the floor at the right side of the driver and the opposite end is attached to an attachment 3 provided at the door 4. The shoulder belt 5 extends diagonally axcross the chest of the driver via an eyelet 6 or the like to a wind up roller 7 provided near the floor of the vehicle. The eyelet 6 may preferably be secured to a support projecting upwardly from the back rest of the seat 8 or it can be secured to the roof of the vehicle or in any other manner. The lap and shoulder straps 1 and 5 are constituted by a one piece belt which slidably extends through an eyelet 9 mounted on the attachment 3 so that the lap and shoulder belt portions are arranged in a substantially V-shaped configuration. The attachment 3 is displaceably mounted in a guide 10 of C-shaped cross section which is attached to the inner side of the door 4 and extends diagonally across the door from an upper point adjacent the front edge of the door to a lower point at the rear edge of the door. In the position shown in FIG. 4 the attachment 3 is capable of being connected to a retaining member 12 secured to the chassis of the vehicle by means of a bolt 11. The means for effecting this interconnection may be made in the same way as in conventional safety belts. Numeral 13 indicates a yoke which is secured to the door 4 by means of screws 14 and which surrounds the attachment 3 in the position shown in FIG. 4 whereby the door is prevented from being opened in case the normal door lock should be damaged in an accident. This prevents the driver from being thrown out of the vehicle. The movement of the attachment 3 along the guide 10 is effected by means of an electric motor 15 and a line 16. The motor being connected to the electric system of the automobile. The line 16 extends from the attachment 3 via a roller 17 at the rear end of the guide and over a roller 18 and extends in one or several loops around a first pulley 19 provided on the motor shaft and a second pulley 20 spaced from said first pulley. In case the line 16 extends in several loops around the pulleys 19 and 20 this may preferably be made with several grooves one for each loop of the line for preventing the loops to entangle when the pulleys are rotating. The line 16 further extends around a further pulley (not shown) which is provided at the other end of the guide 10 and back to the attachment 3. Upon rotation of the pulley 19 the attachment 3 will thus be moved along the guide 10. The motor 15 is mounted on the back side of the guide 10 by the intermediary of springs 21. Due to the spring suspension the motor is given a pivoting movement around an axis parallel to its rotational axis to one side or the other when the attachment 3 reaches one or the other, respectively, of its end positions. These pivoting movements as will be described more closely herebelow are utilized for operating two switches. The attachment 3 is made with a push button release. The push button provided for detaching the attachment 3 from the retaining member 12 is facing the rear side of the guide 10 and in the position illustrated in FIG. 3 this button is disposed opposite an opening in the bottom of the guide. On the back side of the guide there is provided opposite said opening a flexible push rod 22 which is carried by one arm 23 of a two arm lever the other arm of which is indicated at 24 and which pivots around a shaft 25. Numeral 26 indicates a rod which is connected in such a manner to a handle 53 for opening the door that when the handle is operated for opening the door the rod 26 will pivot the lever 23, 24 in a counter clockwise direction which will cause the push rod 22 to operate the push button provided in the attachment 3 so that the attachment 3 will thereby be released from the retaining member 12. The lever 23, 24 is maintained in the position of rest indicated in FIG. 3 by means of a spring 27.

Figure 6:
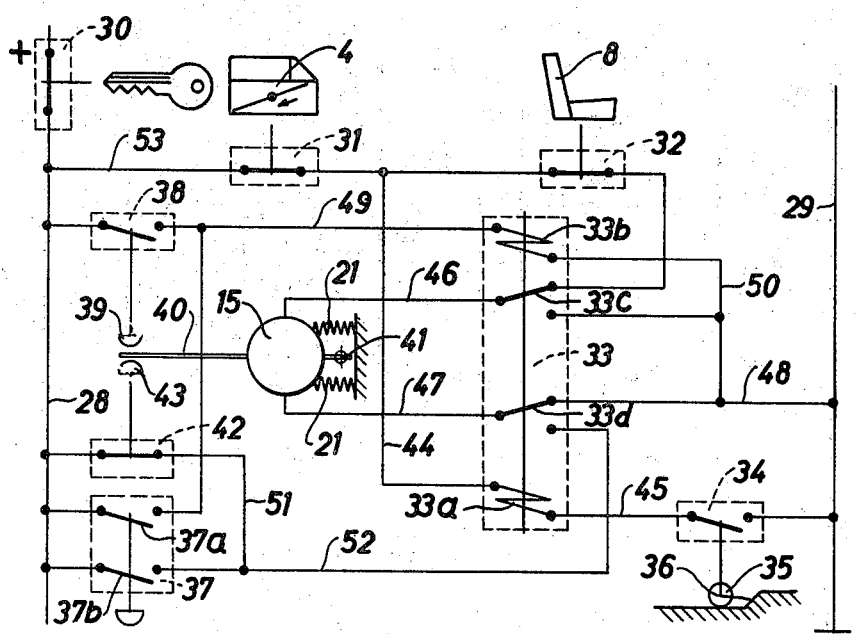
Figure 7:
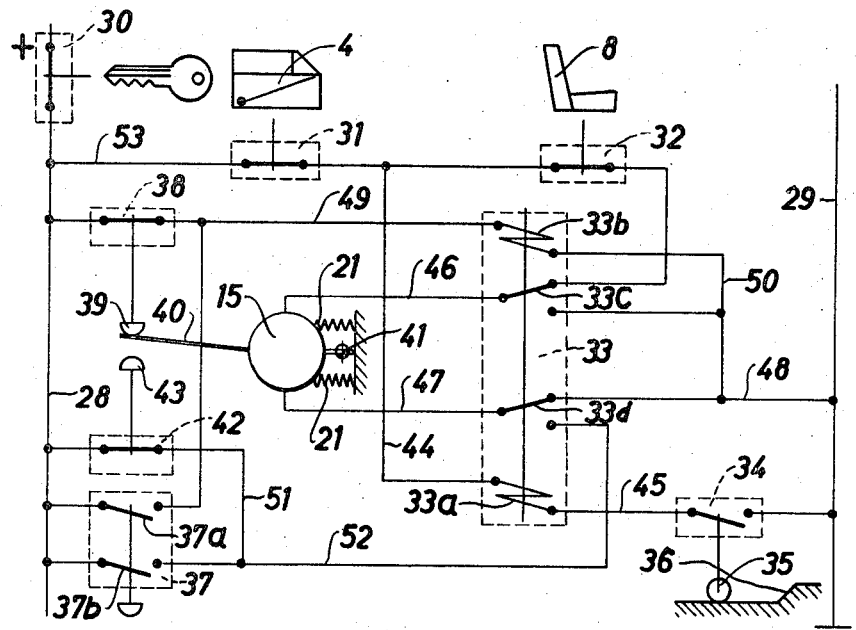
Figure 8:
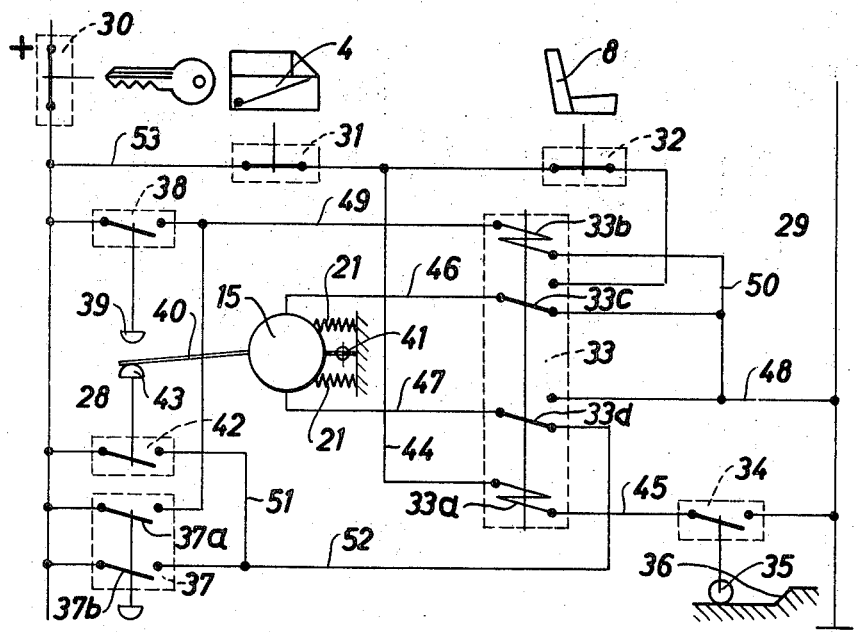
Figure 9:
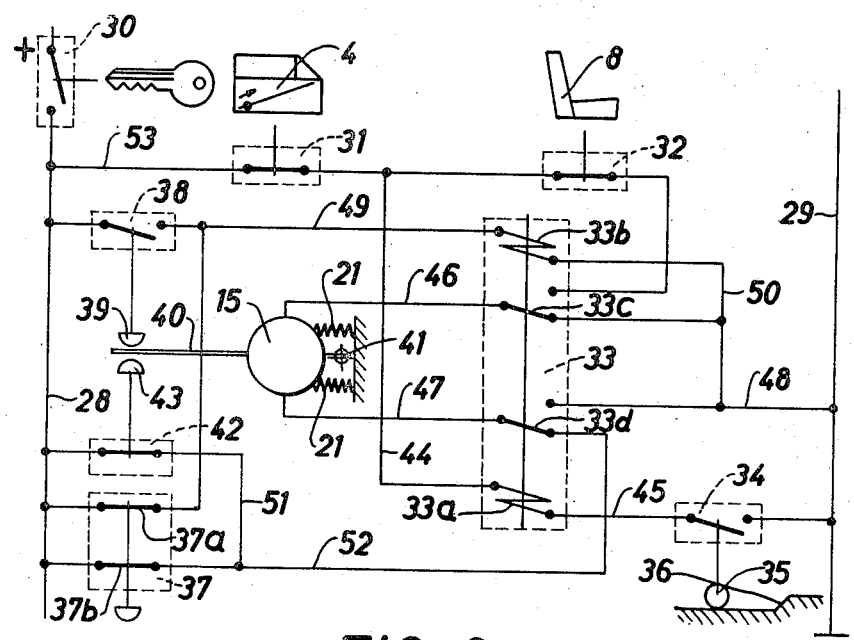
Figure 10:
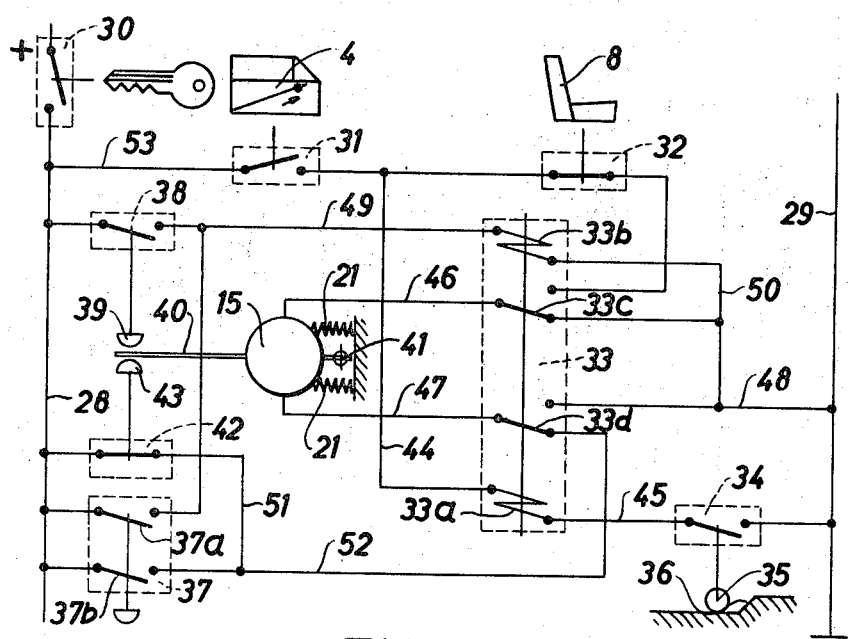

In FIGS. 5 – 10 numeral 28 indicates a lead connected to the plus pole of the car battery and numeral 29 indicates a lead which is connected to the chassis of the vehicle. Numeral 30 is a switch which may be connected for instance to the ignition lock of the vehicle. A switch 31 is provided in the door frame and is closed when the door 4 is closed and open when the door is open. A switch 32 is provided in the seat and is open when the seat 8 is not loaded and closed when the seat is under load. A relay 33 comprises two coils 33a and 33b and switch contacts 33c and 33d which are connected in the circuit of the motor 15. A normally open switch 34 is adapted to be closed when its actuator 35 reaches a shoulder 36 at the front end of the guide 10. Numeral 37 is a two pole normally open switch which is closed upon operation of the handle 53 provided on the door 4 for opening the door. A normally open switch 38 with an actuator 39 is adapted to be operated by the operating member 14 secured to the motor 15 upon pivoting of the motor around the axis 41 in clock wise direction against the action of the springs 21 for transferring the switch 38 to its closed position. A normally closed switch 42 with an actuator 43 is provided to be opened upon pivoting of the motor 15 in counter clock wise direction by abutment of the operating member 40 against the actuator 43. FIG. 5 represents the position of the attachment 3 and the door 4 shown in FIG. 1 and the seat is not loaded and the ignition switch is off. This means that the switches 30, 31 and 32 are open. Since the attachment 3 is in its front end position the switch 34 will be kept closed by the actuator 35 which will be abuting the shoulder 36. When the door 4 is closed and the ignition lock is on, the switches 30 and 31 will be closed as shown in FIG. 6. The lead 28 will then be connected via the leads 53, 44, the coil 33a of the relay 33 and the lead 45 to chassis whereby the relay switches 33c and 33d will be moved to the position shown in FIG. 2 in which the circuit of the motor 15 is closed via the leads 28, 53, the switches 31, 32, the switch 33c, the leads 46, 47, the switch 33d and the leads 48, 29. The motor shaft will then rotate in counter clock wise direction. As soon as the actuator 35 leaves the shoulder 36 the switch 34 will be opened. When the attachment 3 reaches its rear end position and is interconnected with the retaining member 12 the motor shaft is subjected to a resistance which results in a pivoting of the motor in counter clock wise direction against the action of the spring 21 which will cause the switch 38 to be closed. The circuit to the coil 33b of the relay 33 will then be closed through the leads 49 and 50 as appears from FIG. 7. This results in the switch contacts 33c and 33d being thrown to the position shown in FIG. 8 in which the direction of current through the motor is reversed, i.e. the circuit through the motor comprises the leads 28, 51, 52 and 48. This causes the attachment 3 to start to move forward. This movement, however, is halted due to the fact that the attachment is connected with the retaining member 12. This will cause the motor to pivot in clock wise direction which means that the switch 42 will be opened and the circuits through the motor will thus be cut off. This is the condition which prevails during travel with the vehicle that is the condition in which the safety belt is fastened around the person sitting in the vehicle. While the handle 53 is activated for opening the door 4 the switch 37 will be reversed to its closed position whereupon the motor receives current through the switch 37b and the lead 52 and tends to move the attachment 3 forwardly. Continued actuation of the handle 53 will cause the attachment 3 to be mechanically released from the retaining member 12 in the manner described above and the attachment 3 is free to move forward. Since the load upon the motor ceases, the operating member 40 returns to the position indicated in FIG. 9 in which the switch 42 is closed. While the handle 53 is released the switch 37 will open but the motor will then receive current through the switch 42 and the lead 51. When the attachment 3 reaches its front end position the motor 15 will pivot counter clock wise and open the switch 42 which means that the current to the motor is cut off. At the same time the switch actuator 35 abuts the shoulder 36 which will cause the switch contacts 33c and 33d of the relay 33 to be reversed as soon as the coil 33a receives current upon the door 4 being closed again when the ignition lock switch 30 is closed, and the operating cycle is thus repeated.

If for some reason the interconnection of the attachment 3 and the retaining member 12 should not succeed, the attachment 3 will move to its forward end position and back whereafter interconnection is effected. In order to permit disconnection of the safety belt also when the attachment 3 is in its rear end position and cannot be made to move away therefrom, the safety belt may preferably be provided with a mechanical release device provided at one of the attachment points. The transmission ratio between the motor and the attachment 3 should be such that it will not be possible to rotate the motor by means of a force acting upon the attachment 3.

The attachment 3 may also be manually displaceable in the longitudinal direction of the guide 10. Also it is not necessary to mount the guide 10 on the door. Instead the guide may be mounted in some other place in the vehicle at the side wall. The means for driving the attachment 3 may be hydraulic or pneumatic instead of electric. Cut off of the motor 15 may preferably take place with a time delay after opening the switch connected to the ignition lock.

In FIG. 11 an automobile door 4 is shown having mounted to its inner side a channel shaped curved guide for a belt attachment 61 which is displaceably guided in the guide 60. Means 62 are provided for driving the attachment 61 along the guide 60. As will appear from FIG. 14 the guide has a substantially C-shaped cross section having two flanges 63 at the open side engaging in recesses in the side edges of the belt attachment. Those of said recesses which are visible in FIG. 2 are indicated at 64 and 65. The attachment 61 is driven by a motor 66 provided under the bottom of the channel and by the intermediary of gearing 67, 68, a shaft 70 extending through a motor support 60 and the bottom of the channel, a gear wheel 71 provided on said shaft an internal toothing on a drive wheel 72 which is disposed in parallel with the bottom of the channel and is rotatable around an axis 73 at right angles to the bottom of the channel, and a toothed belt 74 extending around the drive wheel 72 and a corresponding drive wheel 87 at the other end of the channel, said belt 74 being secured to the attachment by means of a screw 76 screwed into a depending portion 75 of the attachment. Said depending portion 75 is provided with a number of recesses 77 corresponding to the toothing of the belt 74, the teeth of the belt being kept in engagement with said recesses by means of a washer 78 lying against the outer side of the belt. The shaft 73 is journalled in a bushing 79 mounting in the bottom of the channel and the motor support 69 is mounted pivotally in parallel with the channel bottom around the bushing 79. The shaft 73 is provided at the upper end according to FIG. 2 with an enlarged portion which lies against a shoulder on the drive wheel 72. A washer 81 is locked on the opposite end of the shaft 73. Numeral 82 indicates a pin secured to the bottom of the channel and extending into a circular opening 83 in the motor support 69. Between shoulders formed by the ends of the opening 83 and the pin 82 there extend two pressure springs 84 which tend to keep the pin and thereby also the motor support 69 in the neutral position shown in FIG. 13. When the drive transmission is subjected to a resistance as for instance when the depending portion 75 in its end positions abuts against the abutment indicated at 85 and constituted by a pin secured to the channel bottom, the motor support will tend to pivot around the shaft 73 against the action of one of the springs 84. This pivoting movement is intended to be utilized in substantially the same manner as the pivoting movement of the motor in the previously described embodiment, that is for actuating the switches and the like. As will appear from the drawings those depending portions 75 and 86 which are provided with the grooves in the attachment visible in the drawing are spaced from one another in a manner to allow a small displacement of the attachment also when the guide is of the arcuate shape shown in FIG. 11. The corresponding grooves which are provided at the back side of the attachment 61 according to FIG. 12 may on the other hand extend the whole length of the attachment. Numeral 88 indicates a lever provided under the channel and pivotable on a stud shaft 89 by the influence of a pulling rod 90 which has a T-shaped end portion engaging in a fork-shaped end portion of the lever 88. The lever 88 is normally maintained in the position shown in FIG. 13 by means of a pressure spring 91 which extends between the lever and a fixed abutment 92. The lever 88 is provided with a finger 94 extending through an opening 93 in the channel bottom. Numeral 95 indicates an eyelet for holding the belt forming the safety belt and in its turn connected to the attachment 61 by means of a fitting 96 between two washers 97. The fitting 96 and the washers 97 are kept locked by means of a pin 98 which may preferably be locked by means of a locking pin 99 or the like. This arrangement permits the safety belt to be released. This may be of advantage for instance when repairs are to be made behind the instrument panel or if the attachment 61 has stuck following an accident. A wall 100 projecting from the bottom of the channel delimits a space in which the drive belt 74 extends protected between the two wheels 72 and 87 provided at the ends of the channel. The intermediate wall is provided nearest to the upper wall of the channel shown in FIG. 11 and thus also forms a guide for the belt whereas the lower channel wall in itself forms such a guide. As will most clearly appear from FIG. 13 the fitting 96 is made with a tapering inner end and the tapering side edges are abutting against supporting portions 101 of the housing of the attachment 61 which may preferably be made of plastic material. In FIGS. 12 and 13 the attachment is shown in inactive position i.e. in its front position. In its active position, i.e. the rear position the attachment is intended to cooperate with a retaining member secured in the vehicle chassis and projecting into the attachment 61. For releasing the belt the attachment 61 is released from the retaining member by pulling the rod 90 whereby the finger 94 is moved against a release member 102 on the attachment. The rod 90 may preferably be connected to the door handle of the vehicle. As appears from FIG. 14 the guide channel may preferably be secured to the metal structure of the door by means of a yoke 103. In FIG. 14 the door and the covering are indicated at 104. Flanges 105 project over the visible side of the covering.

The embodiment illustrated in FIGS. 15–18 differs from the previously described in that the slidable belt attachment 106 is driven by means of a motor 107 moving together with the attachment and provided with current by means of contact strips 108 provided in the bottom of the channel 60 and spring loaded brushes 109 provided on the motor support and lying, against said contact strips. In those cases where the channel 60 is made of an electrically conducting material the contact strips 108 are mounted in an isolated material 110. On the motor shaft 111 there is secured a worm gear 112 which engages two worm wheels 113 disposed opposite one another one each side of the motor shaft and having roller portions 114 lying against one another and against the side walls of the channel. The wheels 113 are rotatably journalled on shafts 116 projecting into the channel from a support 115 and are locked by means of locking washers 117. The roller portions 114 may preferably be made with toothing which engages in a corresponding gearing in the channel walls. In this case it is preferable to make the roller portions 114 of a material which is stronger than the material of the toothing in the channel walls. If in such a case the belt attachment should be subjected to too large stresses as for instance in a collission, and it is not secured by means of any retaining member secured to the chassis, the toothing in the channel walls will be successively ripped off which gives a very good absorption of energy. In the embodiment shown the motor 107 is secured to a downwardly bent portion of the support 115 by means of screws 118. The fitting 120 securing the eyelet 119 for the safety belt is secured to the support 115 by means of a pin 121 which is locked by means of a removable locking pin 122. In FIG. 16 there is shown a retaining member 126 secured to the chassis 123 of the vehicle by means of a bolt 124 and a spacing sleeve 125 and which is pivotable in the plane of the drawing against the action of a spring. The door is indicated at 127, the door covering at 128 and numeral 129 indicates the yoke securing the channel shaped guide.

In FIGS. 19 – 21 numeral 130 indicates a motor which is supported by support comprising an outer plate 131 and two end walls 132 and 133 attached to said plate at right angles thereto. The motor shaft which has its free end formed with gears is indicated at 134. The motor shaft 134 engages a gear wheel 135 which is secured to a shaft 136 journalled in the end walls 132 and 133. On the same shaft there is secured a worm gear 137 which engages a gear rack 138 which is formed in the bottom of a guide rail 139 which similarly the guides according to the previous embodiments is made in the form of a channel. The end walls are made with flange like edge portion 132a and 133a, respectively, which engage in grooves in the side walls of the channel. The motor is supplied by current by means of contact strips 140 provided in the bottom of the channel and spring loaded brushes 141 in contact with said strips. The channel 139 may preferably be made of flexible material such as for instance plastic material. Numeral 142 indicates a number of pins which are secured by riveting or in any other manner to the door and which are provided with heads fitting into a groove in the underside of the channel bottom. For mounting the guide to the door the guide is simply pushed over the pin heads from the front or the rear edge of the door 144. The motor 130 is secured to one end wall 133 by means of screws 145. In this arrangement that portion which is provided with the coupling mechanism is secured to the chassis 146 of the vehicle by means of a bolt 147. Numeral 148 indicates a spacing sleeve with at least one portion 148a with an out of round cross section. By making the securing plate 149 with a corresponding out of round cross section the coupling element 150 is prevented from pivoting on the bolt 147. Two rubber rings 151 provide an elastic mounting of the coupling member 150. In this embodiment the coupling member 152 connected with the belt attachment consists only of a plate. A pin 153 is passed through an elongated opening 154 in the support plate 131, a circular hole in the coupling member 152 and a hole in the fitting 155 which is intended to receive the end of the safety belt (not shown). The pin 153 is maintained in its position by means of a locking pin 156 which is preferably arranged in such a way that it may be easily removed. Numeral 170 indicates an arm which is pivotally mounted on the end wall 132 and which extends through an opening 168 in the coupling member 152. When the support 131 – 133 is pulled to the left according to FIG. 19 the arm 166 will be forced due to the relative movement of the coupling member 152, to pivot in clock wise direction and thereby actuate the release member 169 so that the coupling members are released from one another.

In FIGS. 22 and 23 the motor housing is indicated at 157 and the shaft of the motor is indicated at 158. The motor shaft 158 is mounted in the end walls 159 and 160 of a support which also comprises a plate 161 interconnecting the end walls and made with a cross member 162 around which the safety belt may be passed. The motor housing 157 is partly formed as a worm gear which engages in a gear rack formed in the bottom of the channel and which is rotatable around the non rotatable motor shaft 158, the power transmission taking place for instance by means of an internal planetory gear. The end walls 159 and 158 are provided with flange like end portions 159a and 160a which engage in grooves in the side walls of the attachment 163. In the bottom of these grooves are provided current supply strips 164 against which two spring loaded contact brushes 165 are pressed. In this case the guide channel 163 is secured to the sheet metal structure 166 of the door by means of screws 167.

In FIGS. 24 – 28 certain parts which correspond to parts of the embodiment according to FIGS. 1 – 4 are indicated at the same reference numbers as in FIGS. 1

– 4. Numeral 180 indicates a holder for the shoulder part 5 of the safety belt, said holder being comprised for instance by a wire which extends in a curve in the transversel direction of the vehicle between two attachment points in the roof. The shoulder strap 5 extends through an eye 181 provided on the holder 180. If a conventional three-point belt is used instead of a roll belt the belt may at one end be secured to the eye 181 and thus need not to extend further down to the vehicle floor. This is also true for a two point belt where the lap belt 1 is not used. Numeral 182 indicates a spacing member secured to the seat for preventing the belt portion 1 to fall down towards the seat when the safety belt is not used.

In FIG. 25 the movable belt attachment 3 is provided with an eyelet 9 and a handle 183 by means of which the attachment 3 is displaceable along the guide 10. The attachment 3 constitutes one member of a coupling device, the other member of which is indicated at 184. The coupling member 184 is made to automatically lock the rear end portion of the coupling member 3 when the latter is moved in engagement with the coupling member 184. The two coupling members 3 and 184 may be released from one another by actuating the door handle 185, the movement of which is transmitted to the coupling member 184 by means of a connecting rod 186 and an arm 223. The coupling member 184 is mounted on one end of a rail 187 which is secured to the car door by means of screws 188 or the like. These screws are passed through the rail 187 via slots 189. In the inactive state the rail 187 is maintained in the lower position shown in FIG. 25 by a draw spring 190 which extends between an attachment 191 of the coupling member 184 and an attachment 192 on the car door. At the lower side the rail 187 is provided with a key hole shaped opening 193. Numeral 194 indicates a locking member secured to the floor 195 of the vehicle said locking member in the example shown in FIG. 5 being in the form of a rod which has one end secured to the floor by means of a bolt 196. The rod extends from said bolt at an angle upwardly and forwardly and is maintained in this position by an attachment 197 provided in the door frame. The upper end portion of the rod is bent outwardly and provided with an enlarged portion 224 which may preferably be conically tapering as is shown in FIG. 26. The largest diameter of the enlarged portion 224 is less than the diameter of the larger portion of the key hole shaped opening 193. In the inoperative position of the safety belt shown in FIG. 2 the rail 187 is kept by the spring 190 in its lower position in which the enlarged rod portion 224 is opposite the wider portion of the opening 193 so that the door may be freely opened and shut. When the coupling member 184 and thereby also the rail 187 is pulled forwardly the bent end portion of the retaining member 194 enter into the narrower portion of the opening 193 so that the door will be locked. From the belt attachment 3 there extends a line 198 over a pulley 199 rotatably journalled on the door and in a loop over a second pulley 200 which is rotatably journalled on a piston 201 which is displaceable in a tube 202 extending approximately vertically. The end of the line is secured to the upper edge portion of the tube 202. The tube 202 in turn is secured to the door by means of brackets 203, 204. The piston 201 is provided at the lower end with a downwardly directed rod 205. In the position of the piston 201 shown in FIG. 2 the rod 205 extends through a bore in the lower end of the tube 202. The diameter of the rod 205 is slightly smaller than the diameter of said bore. A sealing gasket 206 sealing against the inner wall of the tube 202 is attached to the piston 201. The piston 201 is made of comparatively heavy material which means that it will tend to move the belt attachment 3 forwardly. When the belt attachment 3 is released from the coupling member 184 for instance by the actuation of the handle 185, the piston 201 will move downwardly whereupon the air below the piston will escape through the bore at the bottom of the tube. When the piston is disposed adjacent its lower position the air passage will become restricted by the rod 205 extending into the bore whereby a braking of the movement of the attachment 3 is obtained when the attachment is near its front end position.

In FIG. 27 the retaining member secured to the floor of the vehicle is indicated at 207. At the bent end portion of the retaining member there is provided a pivoted pawl 208 which is pivoted on the shaft 209. A spring 210 tends to maintain the pawl in the position shown in FIG. 4 lying, against an abutment pin 211. Numeral 212 indicates the metal structure of the door and numeral 213 indicates a bracket secured inside the door and having mounted thereon an arm 214 which is pivoted on a shaft 215. The pivoting of the arm 214 in a direction from the position shown in which an abutment pin 216 is lying against the bracket 213 is effected by means of a connecting rod 217 which may be connected at its upper end with the connecting rod 186 in any suitable manner. When the arm 214 is pivoted in clock wise direction the pawl 208 will also swing in clock wise direction which means that it can be moved through the opening in the retaining rail 187.

The means for driving the belt attachment 3 shown in FIG. 28 differs from the one shown in FIG. 25 substantially in that the piston 201 has been replaced by a draw spring 218 which has one end secured at the lower end of a tube 220. Otherwise the line 198 extends over two pulleys 199 and 200 as in FIG. 25. Numeral 219 indicates a sealing which is movable with the pulley 200 and which lies against the wall of the tube. In the wall of the tube 220 there are provided an upper and a lower bore 221 and 222 respectively through which air will escape when the sealing is moved from the position in which the belt attachment is in its rear end position and the spring 218 is extended.

At the beginning of the forward movement of the belt attachment 3 air will escape through both openings 221 and 222 whereas during the later stage of this movement air will escape only through the opening 222 whereby a braking of the movement is obtained. In the embodiment according to FIG. 28 the tube 220 extends down to and is secured to the lower edge of the door.

In FIGS. 29 and 30 the automobile is indicated at 301. Numeral 302 indicates a guide for a slidable attachment member 3. The guide 302 extends along the side and transversely along the roof of the automobile. A portion extending along the side of the vehicle is indicated at 302a and the roof portion is indicated at 302b. The portion 302a is slightly inclined in the longitudinal direction of the vehicle as appears from FIG. 30. The safety belt is of the three point type with a lap belt portion 1 and a shoulder strap portion 5, said lap and shoulder portions being formed by a single belt which extends through an eyelet 306 on the attachment member 3. The shoulder belt portion is windable on a winding up roller 307 which is secured behind the back rest 308 of the seat and the lap belt portion 1 is secured to the chassis of the vehicle. The winding up roller 307 may preferably be of such a type that winding off of the belt is prevented when the vehicle is subjected to sudden accelerations in one direction or the other. In the three point belt shown the belt forming the belts parts 1 and 5 is preferably passing freely through the eyelet 306. In case of a belt of the two point type, i.e. comprising only the shoulder belt portion 5 the outer end of the belt may of course be secured to the eyelet 306. Numeral 309 indicates an electric drive unit for the attachment member, the electric circuit of which is maintained cut off by means of a switch 310 as long as there is no load on the seat 311. The inactive position of the belt is indicated in broken lines in FIG. 29. Numeral 312 indicates a coupling member which is adapted to secure the attachment member 3 in its operative position. The coupling member 312 is preferably adapted to automatically engage the attachment 3 when the latter reaches its lower position. Numeral 313 indicates a release actuator upon the actuation of which the attachment and the coupling member 312 may be released from one another. The driving means 309 may be connected in such a manner that it automatically tends to move the attachment to its inoperative position as soon as it has been released from the coupling member 312 secured to the chassis. It may also be so arranged that the attachment automatically moves to its operative position as soon as the ignition key is turned, or the door to the vehicle is closed or the like. If the switch 310 is connected in series with the electric drive motor for the attachment member the latter will stay in its inoperative position that is in the upper position, as long as the seat is not loaded and the switch consequently is open.

The last described embodiment may also be adapted for mounting in the front seat of an automobile.

In FIGS. 31 – 34 the side wall of the vehicle is indicated at 401, the door is indicated at 402, and the numeral 403 indicates a seat. Numeral 404 indicates a belt forming part of the safety belt and which is placed so that it forms substantially a V with the angle pointing towards the side wall of the vehicle. The belt portion 4a of the belt 404 is secured at its free end to the vehicle floor 405 and the belt portion 40b has its end portion connected to a winding-up roller 406, preferably of the type which prevents winding off of the belt when the vehicle is subjected to rapid accelerations. Numeral 407 indicates a further belt which has one end secured to an eyelet 408 through which the belt 404 is slideably passed and which is secured at its other end to an attachment 409 at the front end of the door. Numeral 410 indicates a slide which is moveable along a guide 411 and which is preferably electrically driven and which is further provided with an eyelet 412 through which belt 407 is passed. Numeral 413 indicates an abutment which is preferably adjustable and which limits the movement of the eyelet 408 in the longitudinal direction of the belt 404, When the slide 410 is in the front position shown in FIGS. 31 and 32 the belts 404 and 407 are in such a position that they will not hinder the entrance into the automobile or exit therefrom. By suitable adjustment of the position of the abutment member 413 the level of the belt 407 above the seat may be adjusted so that the belt 407 does not prevent entrance or exit when the safety belt is in the inoperative position illustrated in FIGS. 31 and 32. When the door is closed and the slide 410 is displaced rearwardly that portion of the belt 407 which extends between the eyelet 408 and slide 410 will be shortened which results in that the belt will be tightened across the body of the person in the seat. Numeral 414 indicates a locking member provided in the chassis of the vehicle for interconnection with the slide 410 in the rear end position thereof thereby locking the vehicle door and at the same time maintaining the safety belt in its active position.

In FIGS. 35 and 36 the seat is indicated at 403 the door at 402, the wall of the vehicle is indicated at 401, the guide is indicated at 411, and the locking member with which the slide is interconnectable is indicated at 414. This embodiment differs from the previous embodiment in that the winding-up roller is mounted together with the slide to form a unit 415. This means that the belt 416 extending between the belt 404 and the door 402 has its outer end portion adapted to be wound up on the winding-up roller provided in the unit 415.

The embodiment shown in FIG. 37 differs from the embodiment of FIGS. 31 – 34 in that the winding up roller 417 is secured at the front portion of the door 402 whereas the reaminder of the safety belt arrangement corresponds to the embodiment of FIGS. 31 – 34.

FIGS. 38 and 39 illustrate an arrangement which may be used in connection with the embodiment shown in FIGS. 35 and 36. As in FIG. 36 the unit formed by the slide and the winding up roller is indicated at 415, the guide is indicated at 411, the door with 402 and the coupling or locking member secured to the chassis is indicated at 414. Numeral 440 indicates two end walls of a support wherein there is rotatably journalled a winding up roller 418 which is provided at one end with a spring 419 which tends to turn the roller 418 in the direction in which the belt 416 is wound up onto the roller. Numeral 420 indicates a roller which extends between the end walls 440. At its upper end the roller 418 carries a tooth wheel 421. Numeral 422 indicates a lever which is pivotally journalled on a shaft 423 and which extends through one of the end walls 440 via a slot 427 and which is provided at its free end with a handgrip 424 for manually swinging the lever. Numeral 425 indicates another lever which is likewise pivoted on the shaft 423 and which is maintained by a draw spring 426 in the position indicated in FIG. 38 relative to the operating arm 422. A draw spring 428 extends between a portion 425a of the arm 425 extending at right angles to the operating arm 422 and the other end wall 417, said draw spring tending to swing both arms 422 and 425 counter clockwise according to FIG. 38 and thereby to move the operating arm 422 which serves as a locking pawl in a direction away from the ratchet wheel 421. Numeral 429 indicates a coupling member which is movable together with the slide and which is interconnectable with a coupling member 430 provided at the rear side of the door. On downwardly bent portions 431 of the bottom portion 432 of the support there are rotatable journalled a number of wheels or rollers 433 which run in the guide 411 which is made in the form of a rail with a C-shaped cross section. The coupling member 430 is secured to the door by means of a holder 434 which is secured in the sheet metal structure of the door 402 by means of screws 441. The coupling member 430 is displaceable in its longitudinal direction relative to the holder 444 a short distance against the action of two draw springs 435. The member 414 is provided with an outwardly bent end portion the outer portion 436 which is wider than the portion 437. The coupling member 430 is provided at the side facing away from the unit 415 with a plate shaped projecting portion 439 which is provided with a T-shaped opening 438 the left portion of which according to the drawing is wider than the left portion 436 of the member 414 and the right portion of which according the drawing is narrower than the end portion 436 of the member 414 but slightly larger than the portion 437. This means that the coupling member 430 will be kept in its position to the right when it is not interconnected with the unit 415 which means that the end portion 436 of the member 419 may freely be moved into and out of the opening 438 which is the case upon opening and closing of the door to the vehicle. When the unit 415 and the coupling member 430 have been interconnected the pulling force in the belt 416 which occurs due to the spring force acting upon the winding-up roller will cause the coupling member 430 to be moved to the left against the action of the springs 435. This takes place under the condition that the springs 435 and 419 have been dimensioned correctly. This means that the door will be locked when the unit 415 and the coupling member 430 are interconnected. Upon interconnection of the unit 415 and the coupling member 430 the portion 425a of the lever 425 will abut against the coupling member 430 and thereby force the levers 425 and 422 to swing in clockwise direction against the action of the spring 428 that is to the position wherein the operating arm 422 is in engagement with the ratchet wheel 421 whereby winding off of belt 416 is prevented. However, the pawl may be released from the ratchet wheel by manually swinging the arm 422 in counter clockwise direction against the action of the spring 426. The releasing of the unit 415 from the coupling member 430 may preferably be effected by the intermediary of a wire or rod or the like provided in the door and forming a connection between the inside hand for opening the door and the coupling member 430.

In FIGS. 40 –41 an automobile door 501 shown in broken lines is provided at its inner side with a guide 502 preferably of C-shaped cross section and extending from a point at the front end of the door to a lower point at the rear end of the door. The movable safety belt attachment 503 is carried by a slide slideable in the guide 502. A coupling member 504 is provided at the lower portion of the inner side of the door and has a slight freedom of movement in the longitudinal direction of the guide 502. The coupling member 504 is adapted to receive a second coupling member 505 carried by the slide. Numeral 506 indicates a fitting provided in the floor or in the door frame and adapted to lock the door in closed position when the safety belt is in its operative position. The coupling member 504 is mounted to the door by means of an attachment 507 which permits said movement of the coupling member in the longitudinal direction of the guide. Coupling member 504 is actuated by springs or the like so that it will tend to move towards its lower rear position. The coupling member 505 is connected to the attachment 503 by means of a pin 508 which has a cross bore in the portion extending outside of the attachment 503. A plate shaped element 509 attached to the coupling member 504 is connected with the coupling member 504 in similar manner, that is by means of a pin 510 which also has a cross bore. In the position illustrated in the drawings the attachment 503 is maintained connected to the coupling 505 by means of a pin 511 inserted in said cross bore, and the element 509 is maintained connected to the coupling 504 by means of a corresponding pin 512. The pins 511 and 512 are provided with heads each having a cross bore for receiving pin-shaped end portions 513 and 514 on a rocker arm 515 which is pivoted on a shaft 516 on the attachment 507. The rocker arm shaft 516 extends through an elongated opening 517 in the rocker arm 515 to allow the latter a certain freedom of movement in the direction of movement of the coupling member 504. The element 509 has a T-shaped opening 518 and the fitting 506 has an upper end portion of such shape that it may be moved laterally into the wider portion of the opening 518 but will be locked to the element 509 when the latter is in the position shown in FIG. 41. By pulling out the pins 511 and 512 which in the embodiment shown is effected by swinging the rocker arm 515 in clockwise direction, the attachment 503 may be released from the coupling member 505 and the element 509 may be released from the other portion of the coupling member 504. This will allow the slide to move forwardly and the coupling member 504 will be moved out of the engagement with the fitting 506. The swinging of the rocker arm 515 may be effected by pulling a rod 519 which in the embodiment shown extends upwardly to an operating handle 520 in the form of a two-armed lever pivoted on a shaft 521, one lever arm projecting outside the door and the other lever arm being connected to one end of the rod 519. On the inner side of the door there is provided a pivoted operating handle 522 which has its free end disposed below an abutment 523 on the rod 519. This means that the rocker arm 515 may be swung by lifting the handle 522. Numeral 524 indicates a handle for opening the door which is connected by means of a line 525 and a pulley 526 to an arm 527 on the conventional door lock 528. The rod 519 extends through the arm 527 at the lower side of which is provided an abutment 529 whereby also the normal door lock may be opened by swinging the lever 520 provided with the operating handle. A second two-armed lever 530 is pivoted on a shaft 531. One arm of the lever 530 is so arranged that in one position it will cooperate with an abutment on the lever 520 provided with the operating handle and the second arm is interconnected with a lock button 532 contained in the normal door lock. When the button 532 is pushed down, the lever 530 will swing in clock-wise direction whereupon the abutment portion of the lever will extend across the corresponding abutment portion of the lever 520 which will thereby be locked in the position shown in FIG. 40. When the safety belt is in its position of non-use, that its the slide with the belt attachment 503 and the coupling member 505 are disposed at the front end of the door the coupling member 504 is withdrawn into the attachment 507 by means of springs or the like in such a manner that upon closing of the door the end portion of the fitting 506 will be disposed opposite the wider portion of the opening 518 allowing the door to be closed. When the door is closed and the safety belt is tightened around the person sitting in the seat, that is when the slide with the attachment 503 and the coupling member 505 moves backwardly and engages the coupling member 504, the front end portion of rocker arm 515 will engage the opening in the pin 511 which is non-rotatable with respect to the pin 508. After completion of the interconnection between the coupling members 504 and 505 the slide is moved slightly in the opposite direction either through reversal of the direction of movement of the motor driving the slide or due to the pulling force in the safety belt which may be caused by a winding up roller or the like. The element 509 will then come to the position relative to the fitting 506 shown in FIG. 41 so that auxilliary locking of the door to the door frame is obtained.

In the case of an accident as a result of which the person in the seat is unconscious or for other reasons is prevented from releasing himself from the seat, the safety belt may released from the outer side of the vehicle by pulling the operating handle of the lever 520 which causes the operating rod 519 to the raised which in turn causes the rocker arm 515 to swing in clockwise direction and consequently the withdrawal of the pins 511 and 512 from the pins 508 and 510, respectively. The belt attachment 503 will thereby be released from the coupling member 505 and the element 509 will be released from the coupling member 504 whereby the safety belt is released and the auxiliary door lock is opened. By abutment of the member 529 against the lever 527 of the lock 528 also the normal door lock will be released upon actuation of the operating handle. When the handle 524 is actuated for opening the door in the normal manner the arm 527 swings freely with respect to the operating rod 519 without actuating the rocker arm 515. A release may also take place from the inner side by pulling the handle 522 which will abut the member 523 and thus raise the rod 519. The locking device 530, 531 is intended to prevent unauthorized pulling of the operating handle for instance when the vehicle is left in a parking place. This arrangement is relevant for such vehicles where the button 532 is pushed down in connection with locking of the door.

I claim:

1. A safety belt arrangement for vehicles having at least one door and seat, comprising at least one belt part which in use extends from one side to the other of the seat in the vehicle across a person sitting in said seat, means securing one end of said belt part to an inboard structural portion of the vehicle at the inner side of said seat, guide means provided to the opposite side of said seat and extending from a forward point to a rear point of the vehicle door, means havng other end of said belt part slideably extending therethrough and being slideably mounted in said guide means for moving said other belt part from a rear position of the door to a front position thereof allowing entrance by a person to and exit from the seat and back to said rear position in which the safety belt is tightened around the passenger and vice versa, springs mounted on said guide means, an electric motor mounted on said springs and capable of pivoting against the action of said springs around an axis parallel to the output axis of said motor, an electrical circuit, a pair of switches in said circuit positioned for being actuated by the pivoting movement of said motor, one of said switches being capable of reversing the direction of rotation of said motor, the second of said switches capable of cutting off the supply of current to said motor and means operatively connecting said motor to said attachment means and capable of pivoting said motor when said attachment means reaches said front and rear positions.

2. A safety belt arrangement as claimed in claim 1 including retainer means connected to the chassis of the vehicle and capable of locking said slideable attachment means in its rear end position.

3. A safety belt arrangement as claimed in claim 2, including movement transmitting means connected to the handle of the door and said retainer means for causing said moveable attachment means to be released from said retainer means upon operation of the door handle.

4. A safety belt arrangement as claimed in claim 3, including means operable by the door handle for closing the supply circuit to said motor for moving said moveable attachment means to its front position.

5. A safety belt arrangement as claimed in claim 2, including switch means in the current supply circuit for said motor capable of reversing the direction of current through said motor and thereby the direction of rotation of said motor and means for actuating said switch means for reversing the rotational direction of said motor upon said moveable attachment means reaching its rear end position and locking with said retainer means.

6. A safety belt arrangement as claimed in claim 5, wherein said current reversing switch means are constituted by switch contacts of a relay provided with two relay coils, said switch actuated by the pivoting movement of said motor for reversing the direction of current being connected in the circuit to one of said relay coils.

7. A safety belt arrangement as claimed in claim 2, including a yoke attached to the door for surrounding the moveable attachment means in its rear position.

8. A safety belt arrangement as claimed in claim 1, wherein said safety belt is of the three point type with a shoulder belt portion and a lap belt portion formed by a single belt extending through an eyelet carried by said displaceable attachment means.

9. A safety belt arrangement as claimed in claim 1 and for use in the front seat of a vehicle characterized in that said guide means is provided on the inner side of the door of the vehicle and extends from an upper point at the forward edge of the door to a lower point at the rear edge of the door.

10. A safety belt arrangement as claimed in claim 9, wherein said guide means extends in an arc from said forward upper point of the door to said lower rear point so that the front portion of the guide is nearly horizontal whereas its lower portion is nearly vertical.

11. A safety belt arrangement as claimed in claim 1, wherein said guide means has a C-shaped cross-section.

12. A safety belt arrangement as claimed in claim 1, wherein said moveable attachment means is in the form of a slide slideable along a said guide means and said operatively connecting means includes an endless line, wheels journalled at the ends of said guide and having said line passing therearound, and said line being connected at one point to said slide for moving said slide.

13. A safety belt arrangement as claimed in claim 12 wherein said endless drive is in driving connection with said spring mounted electric drive motor.

14. A safety belt arrangement as claimed in claim 12, wherein said line being in the form of a toothed belt which engages in corresponding teeth on said wheels.

15. A safety belt arrangement as claimed in claim 1, said moveable attachment means being in the form of a slide displaceable along said guide means and having said electric drive motor for effecting movement of said slide attached thereto, said drive motor being in driving connection with said guide by means of wheels rotatably journalled on said slide and running on wheel tracks provided on said guide means.

16. A safety belt arrangement as claimed in claim 15, wherein the power transmission from said drive motor to said wheels is by means of a worm gear.

17. A safety belt arrangement as claimed in claim 15, wherein the axes of rotation of said wheels are disposed in a common plane at right angles to said guide means, said wheels being pressed against said wheel tracks by means of the force with which the wheels press against one another.

18. A safety belt arrangement as claimed in claim 1, said moveable attachment means being in the form of a slide displaceable along the said guide means and having said electric drive motor attached thereto, said motor being in driving engagement with said guide by means of a worm gear arranged on said slide and engaging a gear rack extending along said guide means.

19. A safety belt arrangement as claimed in claim 18, wherein said worm gear is formed by the casing of an outer rotor motor, the inner stator part of which is nonrotatably secured to said slide.

20. A safety belt arrangement as claimed in claim 1, wherein the current supply to the motor is by means of contact strips on said slide lying against said strips.

* * * * *